United States Patent Office 2,937,937
Patented May 24, 1960

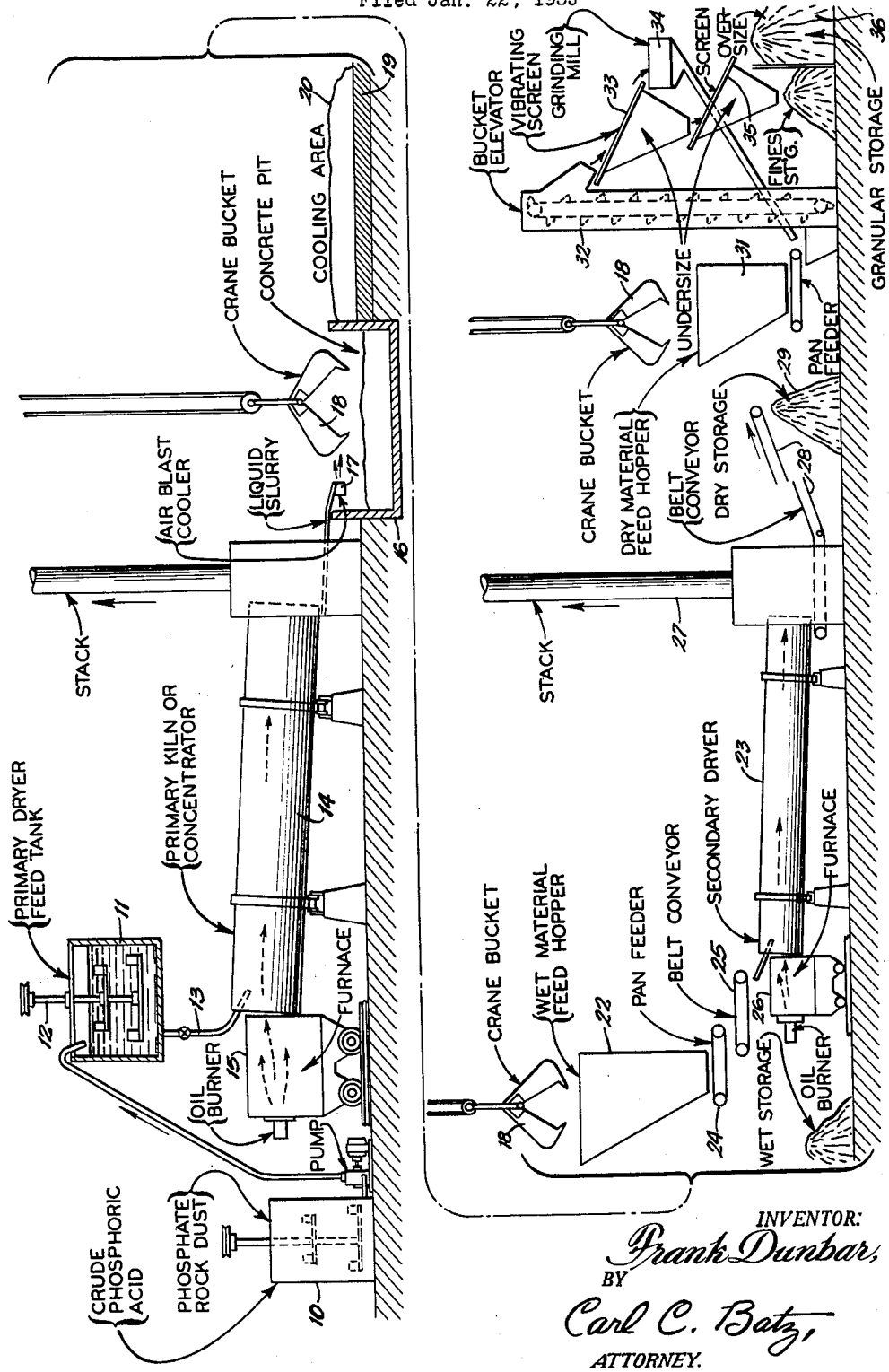

2,937,937

PROCESS FOR PRODUCING GRANULAR TRIPLE SUPERPHOSPHATE

Frank Dunbar, Atlanta, Ga., assignor to Armour and Company, Chicago, Ill., a corporation of Illinois Filed Jan. 22, 1953, Ser. No. 332,735

1 Claim. (Cl. 71—41)

This invention relates to a process for producing granular triple superphosphate, and more particularly to a process in which the triple superphosphate is produced within a shorter time interval, in granular form, and of high quality as to mechanical and chemical condition.

This application is a continuation-in-part of my co-pending application, Serial No. 143,299, filed February 9, 1950, now abandoned.

In a prior process described by William Barkley King in Patent No. 1,780,620, ground phosphate rock was mixed with dilute phosphoric acid to form a slurry and the slurry heated and dried simultaneously to form a thick liquid which was discharged into a pit or other container. In the pit, the chemical reaction was completed to a substantial extent and the material set to a solid mass. The solid material was then removed and dried.

Other processes are in commercial use for the production of triple superphosphate, and such product is produced in non-granular form and in large quantities by such processes. However, some processes do not use pits but instead pass the material through from the mixer to storage. In all of the processes, however, curing time is required, and the chief difficulty is the amount of time consumed by the long standing period, usually of from 24 to 72 hours or longer, as in the King process, and for similar reacting and curing periods in the other processes. There has long been a need for a process in which the cycle of the process is reduced while at the same time producing a product in the desired granular form.

The manufacture of triple superphosphate has followed somewhat the same procedure as is the standard practice for normal superphosphate, wherein strong sulphuric acid acts upon pulverized phosphatic rock to produce material that can be handled by mechanical means. Similarly, the two products must be allowed to remain in storage several weeks to cure, which means to dry somewhat, but mainly to allow time for the free acids to react through the mass on undissolved phosphatic rock to reduce the insoluble portion.

I have heretofore suggested that the slurry formed after mixing the ground phosphate rock and phosphoric acid might be taken after discharge from the primary dryer or concentrator directly to the secondary dryer. I have found that this process does not give satisfactory results because the water content is high and when fines are added to take up the water, a high insoluble content results. Further, the fines, when added to the slurry with its water-free content, do not produce a mixture which, when introduced into the secondary dryer, gives the large percentage of granules of the desired size.

An object of the present invention is to provide a process in which granular triple superphosphate is produced in high quality and yield, while at the same time greatly reducing the time required for production of the product. Other specific objects and advantages will appear as the specification proceeds.

The invention is illustrated in a single embodiment by the accompanying drawing, in which apparatus suitable for the carrying out of the process is shown diagrammatically.

In the phase of the invention illustrated in the drawing, phosphoric acid and phosphate rock dust are placed in a tank 10, which may be constructed of wood, and the mixture agitated. The rock and phosphoric acid may be mixed in varied proportions. In the specific example given, they are mixed in the proportions of about 1 pound phosphate rock dust per pound of $P_2O_5$ in the acid.

The thin slurry resulting from the above mixture is pumped to a feed tank 11, which may be equipped with continuous agitating mechanism 12, and from this tank the mixture is fed through valve control pipe 13 to the firing end of a rotary kiln or dryer 14 heated by an oil-fired furnace 15. The slurry is discharged from the kiln 14 into a concrete pit 16, and may be dispersed and cooled by a blast of air from the pipe 17 as it is discharged into the pit.

After remaining in the pit or den for the desired length of time, but before the material is set to a solid condition, it is removed from the pit by an overhead crane 18 or other suitable means and spread over a concrete floor 19. I find that good results are obtained when the material is removed from the pit after about 8 to 22 hours. When removed, it is sufficiently fluid or semi-solid to form a covering 20, as indicated in Fig. 1, over the floor, and there it sets to a solid condition. By "fluid" is meant a material, either liquid or semi-solid, which flows or spreads. The material, which now forms a solid mass, is removed by a crane bucket 18 and deposited in a feed hopper 22 for the secondary dryer 23. Because of the sticky condition of the mud material, I prefer to employ a pan feeder 24 and a belt conveyor 25 to tend to disintegrate the material and to transfer it with a uniform feed to the firing end of the secondary dryer 23. This dryer may also be provided with an oil furnace 26 similar to furnace 15. Each of the kilns or dryers 23 and 14 is provided with stacks 27. A belt conveyor 28 is employed for removing the dried material from the secondary dryer 23 and for forming a pile 29 thereof.

The triple superphosphate discharged from the secondary dryer 23 may be taken by the conveyor belt 28 to a storage, where it may remain for four hours or longer. From the storage pile 29 it is preferably removed by crane bucket 18 and deposited in a feed hopper 31 for a screening and grinding unit. In this unit, a bucket conveyor 32 feeds the triple phosphate to a vibrating screen 33. The oversize on this screen goes to a grinding mill 34 and is then returned to the boot of the elevator 32 to mix with the incoming feed. The undersize from the screen 33 goes to a screen 35 therebelow, and the sized granular product goes directly to storage in pile 36 for shipment. The undersize material, or fines 37, goes to fines storage, or may be reused in the process, as will be later described.

In the above screening unit, I prefer to employ a —5 mesh vibrating screen 33, and a —10 mesh screen 36.

The phosphoric acid employed is preferably about 16 to 38% $P_2O_5$. It will be understood that substantial variations in the percentage of the $P_2O_5$ in the acid may be made, depending upon the process used for producing the acid, the type of phosphate rock used, and other factors. Phosphoric acid of 16 to 25% $P_2O_5$ has been used to produce an extremely good granular product.

In removing the material from the pit or other container for cooling, I prefer to bring about such removal after the reaction has occurred to a substantial extent but while the material is still fluid; that is, the material is either liquid in character or semi-solid, so that when poured upon a surface it will tend to flow over the surface. For example, if the material is left in the pit for from 8 to 16 hours, or preferably 8 to 12 hours, the material when removed and placed upon a surface over which it will flow to form a thin layer, quickly sets into a soft, sticky solid or mud. The mud is characterized by its high retention of moisture. The water is bound up in the material and does not exist as free surface water, and the material is unique as a feeding material for the rotary dryer. Even though large bodies of the mud thus formed are dumped into the rotary dryer, there is a breaking up of the mass quickly into rather uniform sized pellets of the desired size, so that a final granulated product is formed without fines or with fines which constitute less than 5% by weight of the starting material.

Since the mud or gummy solid retains its moisture, it is not necessary to add water to the material just before it is fed to the secondary dryer. While the material does not seem to be wet, there is a large content of water in the mud and the consistency is such that when the mass strikes the interior of the rotary dryer, it breaks up quickly into small granules.

After screening the dried product to obtain the desired sized particles, some of the oversize lumps are ground to produce a further yield of the desired granulation, but in grinding this product some fine, flour-like material is produced. Such fines are advantageously returned to the preceding steps in the system, not only as a means for recovering the fines, but for improving the operation in such preceding steps. For example, the fines may be returned and discharged into the receiving pits with the hot slurry being discharged from the kilns. Also, the fines may be spread over the "lakes" of slurry spread out in shallow layers on the floor to cool. This procedure has the effect of increasing the capacity of the kilns in that the slurry does not have to be concentrated to as great an extent and, with respect to the layers of slurry on the floor, it is found that this step lessens the time required for the slurry to cool before it can be put through the secondary dryer. As a result of the return of the fines, it is found that the entire production of the plant can be made into the desired granular product for the bagged goods trade. The granular product is found to be superior to any granular product now appearing on the market as to mechanical condition, and equal or superior to any of such triple superphosphate products as to chemical condition.

By taking the material from the receiving pits at a much earlier stage than in processes heretofore employed and cooling the material in thin layers upon a concrete surface, it is found that the process is considerably shorter in time than those heretofore employed, while producing a superior product in form and chemical condition. The process is further improved by continually cooling the slurry as it is discharged from the primary kiln or dryer. The material may be dug out of the pits after about eight hours or less, and it is preferred to remove such material in twenty-two hours or less. It is desired to leave the material in the pit sufficiently to substantially complete the reaction but before the material has set to a solid condition. The material is thus removed while still in a fluid condition and spread upon the cooling concrete surfaces whereby an almost instantaneous setting of the material is brought about. This operation in some manner conditions the material so that in the following drying step the product produced is a granular product. It is possible that such handling causes retention of moisture in the mass which promotes granulation in the secondary dryer.

The foregoing process may be carried on in a continuous manner, the screening and grinding being accomplished continuously in a closed circuit, and the fines may be added to a continuous cooler or conveyor.

After the material is taken from the pit or other container and deposited upon a surface for cooling, it tends to set up into a soft, sticky solid. It does not air-dry readily but seems to remain wet and gummy, and in this condition is easily transferred to the secondary dryer. I prefer to use the pan feeder and belt conveyor as shown in the drawing, so as to effect a disintegration of the material and to cause it to be fed in a more uniform manner to the secondary dryer. In both primary and secondary dryers, I prefer to have concurrent flow of heat and material.

The product obtained from the secondary dryer is found to be almost completely granular, with very little dust and a small amount of large lumps. When the material is put over vibrating screens with the oversized material being recirculated and ground and rescreened as described in the drawing, there is produced on an average about 60% of finished granular product and about 40% of fines. By returning the fines by an overhead crane bucket or other means to the receiving pits, where they are mixed with the hot slurry being discharged from the kiln, or by spreading a portion of the fines over the "lakes" or bodies of slurry spread out on the concrete floor, the slurry is found to cool much more quickly and the time interval elapsing between the pouring of the slurry onto the concrete and the passing of the solidified material into the dryer is considerably lessened.

Heretofore considerable trouble has been encountered from time to time in shipping triple superphosphate in bags. Lime is usually added to the triple superphosphate to reduce th free acid content which attacks the bags. With the present product, no bag failures due to the chemical character of the product have occurred, even though the product has been shipped in bags without lining. In the product produced by drying the material taken from the concrete floor, it is found that almost the entire product, except for a few large lumps, is granular in condition, the dusty material being less than 5% by weight.

Specific examples may be set out as follows:

EXAMPLE I

Dilute phosphoric acid analyzing 21.5% total $P_2O_5$, 0.00% insol. $P_2O_5$ at 130° F. is pumped into a wooden tank. Phosphate rock ground to approximately 90% $-100$ mesh is added to the tank in proportions of one pound of phosphate rock dust per pound of $P_2O_5$ in the acid, and the mixture agitated.

The thin slurry resulting from the above mixture is pumped to a circular feed tank equipped with a continuous agitating mechanism, and from this feed tank is fed continuously to the firing end of a rotary kiln heated by an oil-fired furnace.

The slurry as fed to this primary kiln or dryer is at 140° F., and contains 8.00% free acid, 24.40% total $P_2O_5$, 2.40% insoluble $P_2O_5$ and approximately 47.5% $H_2O$.

Within the primary kiln or dryer the slurry is heated and concentrated so that upon discharge it is at 21.5° F. and contains 7.75% free acid, 38.8% total $P_2O_5$, 2.50% insoluble $P_2O_5$, and approximately 20.0% $H_2O$.

The slurry is discharged from the primary kiln or dryer into a concrete pit 13' x 25' x 10' deep, and is cooled by a blast of air as it is discharged into the pit.

After remaining in the pit for 12 hours, the material is removed by a 2½ cu. yd. overhead crane bucket and spread over a concrete floor. After cooling and setting to a solid condition, which occurs in 12 hours, the material is again removed by the crane bucket and deposited in a feed hopper for the secondary dryer, which is also a rotary dryer heated by an oil-fired furnace. The material as fed to the secondary dryer is at 110° F. and contains 5.8% free acid, 38.8% total $P_2O_5$, 1.5% insoluble $P_2O_5$, and approximately 20.0% $H_2O$. It is a sticky mass and should be disintegrated so as to give a uniform feed to the dryer.

Within the secondary dryer the material forms into granules or hard pellets, and is further dried, so that upon discharge it is at 250° F., and contains 5.1% free acid, 46.8% total $P_2O_5$, 1.3% insoluble $P_2O_5$, and approximately 5.8% $H_2O$.

Actual screen analysis at discharge shows 28.54% plus 4 mesh
22.00% minus 4 M.—plus 6 mesh
16.01% minus 6 M.—plus 10 mesh
23.89% minus 10 M.—plus 20 mesh
9.24% minus 20 M.—plus 60 mesh
0.32% minus 60 M.

The triple superphosphate as discharged from the secondary dryer is taken to storage by a conveyor belt, where it remains four hours or longer.

From storage, it is removed by a crane bucket and deposited in a feed hopper to the screening and grinding unit. In this unit a bucket elevator feeds the triple superphosphate to a —5 mesh vibrating screen. The oversize on this screen goes to a grinding mill and is then returned to the boot of the elevator to mix with the incoming feed.

The undersize from the —5 mesh screen goes to a —10 mesh screen, and the oversize granular product goes directly to storage for shipment.

The undersize from the —10 mesh screen, which is 40% of the material fed to the grinding unit, goes to fines storage. Screen analysis of the granular and fines are:

Granular: Percent
+6 mesh _____ 11.85
—6 M. +10 M _____ 64.28
—10 M. +20 M _____ 19.19
—20 M _____ 4.68

Fines:
+20 M _____ 41.6
—20 M. +40 M _____ 25.0
—40 M. +60 M _____ 8.3
—60 M _____ 25.1

Chemical analysis is as follows:

| | Total $P_2O_5$, percent | Insol. $P_2O_5$, percent | Avail. $P_2O_5$, percent | Free Acid, percent | $H_2O$, percent |
|---|---|---|---|---|---|
| Granular | 46.70 | 1.15 | 45.55 | 3.20 | 5.00 |
| Fines | 46.80 | 1.00 | 45.80 | 3.25 | 5.00 |

The granular product thus produced is an ideal product for shipment in bags and direct application as a fertilizer.

The fines as produced above make an excellent product for mixing in complete fertilizers, especially of high analysis.

EXAMPLE II

When it was not desirable to produce fines for further mixing in complete fertilizers of high analysis, a completely granular end-product was produced by recirculating the fines back into the system.

The fines were handled with the crane bucket and mixed with the incoming slurry in the concrete pit receiving the discharge from the primary dryer, and mixed with the slurry being cooled on the concrete floor. The composition of the slurry fed to the primary dryer thus remained the same, but less heat was required due to the cooling and drying effect of the recirculated fines, so that when discharged into the pit containing the recirculated fines, the slurry was at 210° F. and tested 35.95% total $P_2O_5$, 2.35% insoluble $P_2O_5$, 7.25% free acid, and approximately 22.5% moisture.

The proportion of fines added to the slurry was such that when the mixture was cooled and solidified and delivered to the feed hopper to the secondary dryer, it was the same sticky mass as described in Example I, and was at 100° F. and tested 39.6% total $P_2O_5$, 2.0% insoluble $P_2O_5$, 6.5% free acid, and approximately 20.0% moisture.

The amount of fines recirculated varied with the requirements, but in actual plant practice it was found that they were satisfactorily recirculated in the proportion of ⅔ lb. $P_2O_5$ in fines to 1 lb. $P_2O_5$ in slurry, which was required for production of an all-granular end-product when 40% fines were produced from the grinding unit.

When recirculating at this maximum rate required, the product discharged from the secondary dryer was at 250° F., and tested 46.75% total $P_2O_5$, 1.3% insoluble $P_2O_5$, 5.10% free acid, and approximately 5.75% moisture.

The screen analysis of the product discharged from the secondary dryer was:

28.5% plus 4 mesh
22.0% minus 4 M.—plus 6 mesh
16.0% minus 6 M.—plus 10 mesh
23.9% minus 10 M.—plus 20 mesh
9.3% minus 20 M.—plus 60 mesh
0.4% minus 60 M.

This product was handled through the grinding and screening unit in the manner described in Example I, and the product of the grinding and screening unit was 40% fines and 60% granular material; all of the fines were returned to the system as described above.

When recirculating the fines in this manner, the screen tests and chemical tests on the two products were as follows:

*Screen test*

Granular: Percent
+6 mesh _____ 11.8
—6 M.+10 M _____ 64.3
—10 M.+20 M _____ 19.2
—20 M _____ 4.7

Fines:
+20 M _____ 41.6
—20 M.+40 M _____ 25.0
—40 M.+60 M _____ 8.3
—60 M _____ 25.1

Chemical analysis was as follows:

| | Total $P_2O_5$, percent | Insol. $P_2O_5$, percent | Avail. $P_2O_5$, percent | Free Acid, percent | $H_2O$, percent |
|---|---|---|---|---|---|
| Granular | 46.70 | 1.15 | 45.55 | 3.20 | 5.0 |
| Fines | 46.80 | 1.10 | 45.80 | 3.25 | 5.0 |

The mud or sticky solid formed after the material is withdrawn from the pits after a period of eight to twelve or sixteen hours, forms a unique feeding material for the secondary dryer in that, without adding water or attempting to change the character of the material at all by additions, the mud or sticky solid, which retains a high water content, almost instantaneously breaks up into granules or pellets within the secondary dryer and with substantially no fines. The yield of granules is extremely high and a large proportion of the product produced is ready for immediate packing. While I have been able to produce the sticky solid feed material or mud only by the intermittent steps of holding the material for a period of time before spreading it on a cooling surface, it will be understood that variations in the process may be employed which still produce a feed or mud of the characteristics described and which results in the production almost quantitatively of pellets or granules ready for packaging.

While in the foregoing specification I have set out specific procedures and examples of the process in considerable detail, it will be understood that such details may be varied widely by those skilled in the art without departing from the spirit of my invention.

I claim:

In a process for preparing granular triple superphosphate wherein there is first formed a thin, aqueous slurry containing the phosphoric acid and finely-divided phosphate rock to be reacted, the slurry is concentrated, the concentrated slurry allowed to set in a den, and thereafter the denned material is granulated in a rotary dryer, the improvement comprising interrupting said den setting step at a stage where the denned material is in a flowable, semi-solid condition by removing said material from said den during stage, said material being removed from said den after having been therein for at least about eight hours and before said material has remained therein for over sixteen hours, flowing and spreading the removed material over an extended area to form a bed thereof having an enlarged surface contact with the atmosphere for accelerating the setting of said removed material, interrupting said last-mentioned setting step to obtain a feed for said rotary dryer when the material in said bed has reached the condition of a soft, sticky, non-flowable mud, thereby obtaining a material which can be readily granulated, feeding said soft, sticky, non-flowable mud into a rotary dryer, and forming said mud into a granular product within said dryer.

References Cited in the file of this patent

UNITED STATES PATENTS

| | | |
|---|---|---|
| 1,780,620 | King | Nov. 4, 1930 |
| 2,136,793 | Gabeler et al. | Nov. 15, 1938 |
| 2,148,209 | Loiseau et al. | Feb. 21, 1939 |
| 2,164,986 | Cox et al. | July 4, 1939 |
| 2,167,432 | Cox et al. | July 25, 1939 |
| 2,287,759 | Hardesty et al. | June 23, 1942 |
| 2,442,513 | Sackett | June 1, 1948 |
| 2,448,126 | Shoeld | Aug. 31, 1948 |

FOREIGN PATENTS

| | | |
|---|---|---|
| 620,590 | Great Britain | Mar. 28, 1949 |